Jan. 19, 1965   G. D. HALL   3,166,092
AUTOMATIC HIGH-LOW PRESSURE CUTOFF
Filed Nov. 8, 1963   2 Sheets-Sheet 1

George D. Hall
INVENTOR.
BY J. Vincent Martin
   Joe E. Edwards
   M. H. Gay
ATTORNEYS Jan. 19, 1965    G. D. HALL    3,166,092
AUTOMATIC HIGH-LOW PRESSURE CUTOFF
Filed Nov. 8, 1963    2 Sheets-Sheet 2

George D. Hall
INVENTOR.
BY
ATTORNEYS

United States Patent Office 3,166,092
Patented Jan. 19, 1965

3,166,092
AUTOMATIC HIGH-LOW PRESSURE CUTOFF
George D. Hall, Houston, Tex., assignor to Thornhill-Craver Company, Houston, Tex., a corporation of Texas
Filed Nov. 8, 1963, Ser. No. 322,376
4 Claims. (Cl. 137—458)

This invention relates to automatic valves, and more particularly to automatic shutoff valves for pipelines.

It is customary with petroleum pipelines to take a pressure reduction in the pipeline adjacent the well head. In the event of a line breakage or "freezing" due to hydrate buildup, it is desirable to have a safety control valve in the line upstream of the point of pressure reduction to close the line adjacent the well head. A control valve for this service is shown in the patent to Thornhill, No. 3,049,140. This invention is an improvement in valves of the type shown in this Thornhill patent.

This valve utilizes an orifice in a conduit between the motor control system and the line downstream of the point of pressure reduction. When the valve is in manual open position, pressure fluid flows through the valve control system and this orifice from the valve body to the line downstream of the pressure reduction. As this flow is through the small orifice referred to, there is a danger of trash clogging the orifice and the possibility of "freezing" or building up of hydrates at the orifice to stop flow therethrough. These problems are not particularly acute when the valve is in the manual open position for only a short time, but when it is in the manual open position for protracted length of time, some difficulty may be encountered. This problem could be overcome by placing a manual shutoff valve in the system which would shut off this flow after the valve had been placed in manual open position. However, this gives rise to the possibility that the operator may forget to open such an auxiliary valve when placing the system on automatic operation. If such an auxiliary valve remained closed, this would destroy the automatic operation of the system.

It is an object of this invention to improve valves of the type shown in the Thornhill patent by reducing the amount of gas which flows through the valve control system when the valve is in manual open position without impairing the normal operation of the system.

Another object is to reduce the amount of gas flowing through valves, as in the preceding object, wherein the reduction is accomplished automatically and there are no externally controlled valves which might inadvertently be left in the wrong position to impair automatic operation of the system.

Another object is to improve valves of the Thornhill type by reducing the possibility of trouble at the orifice in the conduit leading to the line downstream of the pressure reduction by way of trash accumulating at the orifice or cutting out the orifice due to abrasion, or by way of hydrate formation or "freezing" at this point.

Other objects, features and advantages of this invention will be apparent from the drawings, specification and claims.

In the drawings, wherein an illustrative embodiment of this invention is shown, and wherein like numerals indicate like parts:

Figure 1:
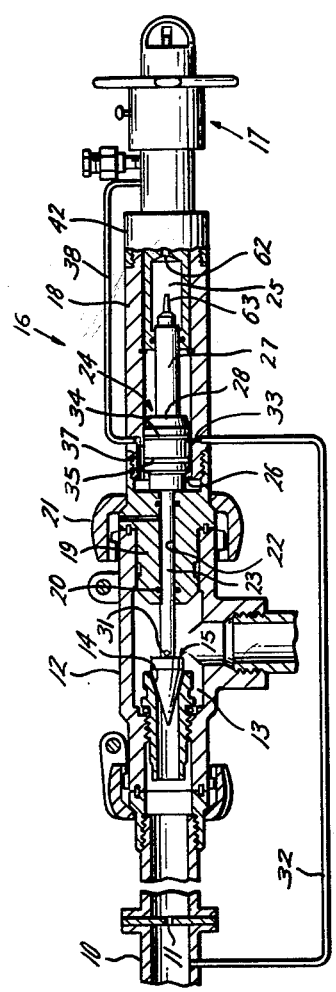
FIGURE 1 is a view partly in elevation and partly in cross-section through an apparatus embodying this invention.
Figure 3:
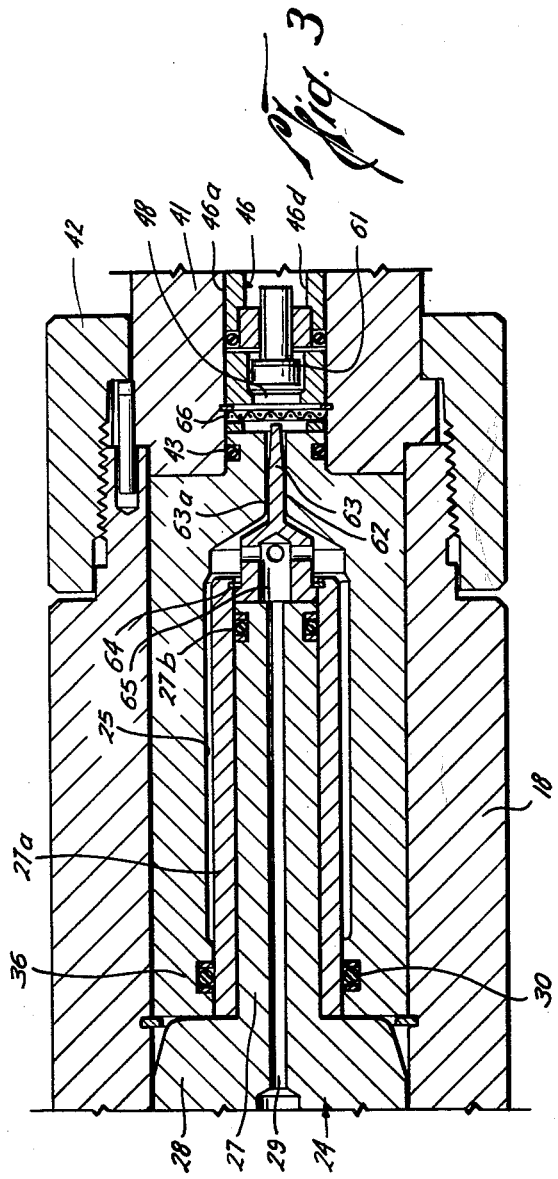
Figure 2:
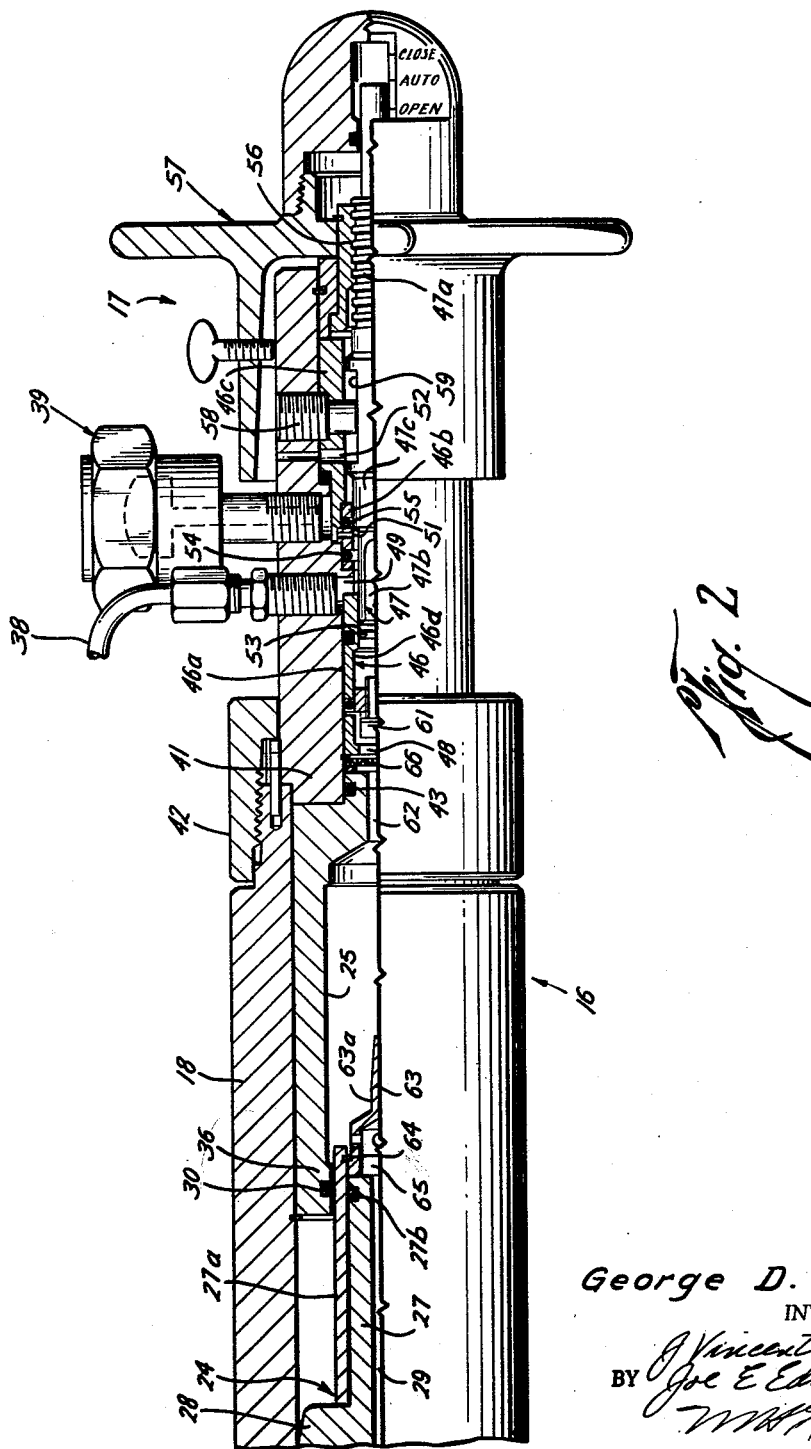
FIGURE 2 is a view partly in elevation and partly in cross-section of a segment of the valve of FIGURE 1 on an enlarged scale; and, FIGURE 3 is a view in cross-section on a still further enlarged scale of an illustrative valve for controlling flow of fluid through the motor system when the system is in manual open position.

Referring to FIGURE 1, the line to be controlled is shown at 10 and has a restriction 11 therein. The valve of this invention is interposed in the line upstream of the restriction 11 and includes a valve body 12 having a flow passageway 13 therethrough controlled by a valve seat 14 and a valve member 15.

The valve member 15 is controlled by a fluid motor indicated generally at 16. On top of the fluid motor is a pilot control indicated generally at 17 which may be positioned to set the fluid motor for automatic operation, or it may be positioned to either open or close the main valve.

The fluid motor includes a fluid motor housing 18 which is secured through an adapter 19 to the main valve body 12 by a nut 21. The adapter 19 has a bore 22 therethrough which establishes communication between the interior of the main valve and the interior of the motor housing 16. An operating stem 23 extends through the bore 22 and connects the main valve 15 with the fluid motor operator indicated generally at 24. Suitable seal means 20 seal between the valve stem and adapter 19.

The fluid motor operator includes first and second fluid chambers or cylinders 25 and 26. The chamber 25 has a movable wall defined by piston 27. In like manner, the chamber 26 has a movable wall defined by piston 28. These two pistons are connected to each other and are connected to the valve stem 23 so that the two pistons and valve member move together.

The first chamber 25 is exposed to upstream pressure by a suitable conduit connecting the chamber with the valve body passageway 13. Preferably, this conduit is provided by a passageway 29 which begins at 31 in the valve stem and extends through the valve stem and pistons 27 and 28 to the free end of piston 27.

The chamber 26 is supplied with pressure from a point downstream of restriction 11 through line 32. A suitable restriction 33 is provided at the opening of line 32 into chamber 26.

It will be noted that the piston 28 is provided with spaced seals 34 and 35 which straddle opening 33 when the main valve is closed. This prevents leakage of pressure from the main line when the main valve is closed.

It will be noted that the size of the movable wall or piston 27 of the first chamber is smaller than the movable wall or piston 28 of the second chamber. Thus, the upstream pressure exerted on piston 27 may be much greater than the downstream pressure exerted on piston 28 with the valve in open position. According to pressure conditions existing in the installation, the size of piston 27 is changed to give the desired area relationship for the pressure conditions existing. With the change in size of piston 27, the insert sleeve 36, which defines a cylinder for cooperation with piston 27, is changed. A suitable seal 30 seals between the insert 36 and piston 27. The size of piston 27 is readily changed by substituting a sleeve 27a of the desired outside diameter. A suitable seal between the piston body 27 and the sleeve 27a may be provided by the O-ring 27b.

From the valve as thus far explained, it will be apparent that with a predetermined pressure condition the valve member will remain open. Upon a break occurring in the downstream line, the pressure within chamber 26 will fall, while the pressure within chamber 25 will remain high. This will result in an unbalance of forces and the motor operated piston 24 will move downwardly to seat the main valve.

On the other hand, if the pressure in the downstream line increases to an excessively high value, it is only necessary to have this increased pressure operate a popoff valve to vent chamber 26 and also close the main valve.

Provision for venting the chamber 26 upon excessive downstream pressure is provided by passageway 37 which communicates with the chamber 26 at a position which is always below the seal 35. This passageway leads to a conduit 38 which in turn is connected through pilot valve 17 to a relief valve indicated generally at 39. Relief valve 39 may be of any desired type, but is preferably a frangible disc which will rupture at a predetermined pressure.

Referring now to the pilot valve, a pilot valve body 41 is provided which is tubular in form and has its open end secured to the upper end of the motor housing 18. The housings are secured together by a suitable nut 42, and an O-ring seal 43 seals between the housing 41 and the cylinder 36.

The pilot housing has a bore therethrough indicated generally at 46, and a valve member indicated generally at 47 is mounted for reciprocation within said bore.

A first opening is provided into said bore at 48 for conducting fluid pressure from the first chamber 25 to the bore. A second opening 49 is provided for conducting fluid pressure from the second chamber 26 through line 38 to the bore. A third opening 51 is provided and establishes communication between the bore and the relief means 39. A fourth opening 52 is provided in the bore for extension to the exterior of the pilot valve housing to provide a vent. It will be noted that the first, second, third and fourth openings are arranged in numerical order and that suitable seals are provided between the several openings for selectively sealing between the valve member 47 and the bore. These seals include a seal 53 on the valve member for sealing between the first and second openings, a seal on the valve body at 54 for sealing between the second and third openings, and a seal 55 in the valve body for sealing between the third and fourth openings. The bore through the body includes inserts 46a, 46b and 46c.

The upper end of the slide valve 47 is provided with a threaded extension 47a which is threadedly engaged by a nut 56 rotatably mounted on the body. The hand wheel 57 is non-rotatably mounted on the nut. Rotation of the hand wheel rotates nut 56 to raise or lower the valve member as the valve member is held against rotation by the co-action of a guide 58 in the pilot valve housing extending into a vertical slot 59 in the valve member.

It will be noted that the valve member 47 has three flat portions, one of which is shown at 47b immediately above the sliding seal 53. Also, an increased diameter section 47c is provided above the flat portion 47b. This increased diameter portion 47c cooperates with seals 54 and 55 to control opening and closing of the third and fourth openings.

A check valve 61 is designed to prevent any possibility of leakage of fluid from the cylinder 25 while the valve is closed.

The chamber or cylinder 25 is provided with a valve seat 62 which is cylindrical and establishes communication between the high pressure chamber 25 and the bore 47 through the control valve and, when the control valve is in manual open position, communication is also established past the check valve 61 to the first inlet 49 and the conduit 38.

Cooperable with seat 62 to control flow of fluid from the chamber 25 into the pilot valve is a valve means. While this valve means might be one which establishes a complete seal, it is preferred that the valve means be provided by the needle valve 63 which throttles flow of fluid from the high pressure chamber 25 by an amount determined by the position of the needle valve member. It will be noted that the needle valve includes at its base a cylindrical section 63a which has a close sliding fit with the seat 62. This sliding fit may be varied from a close to a loose fit, to thus select the maximum degree of restriction. If desired, the fit may be sufficiently close that there is little or no bleed through the seat when the cylindrical section is within the seat. For convenience of manufacture and assembly, the needle valve is secured in the sleeve 27a by a snap ring 64 and has a passageway 65 therethrough to provide for free flow of fluid from the passageway 29 into the high pressure chamber 25.

In operation, the hand wheel may be rotated to move the valve member 47 downwardly until the portion 47c of the pilot valve member engages seal 54 which will isolate the third and fourth openings to the relief member 39 and the vent. Continued downward movement of the valve member will move seal 53 into an enlarged diameter portion 46d of the bore. This will permit fluid to flow from the chamber 25 to the chamber 26 as the check valve 61 will be engaged by the lower end of the slide valve 47 and unseated at approximately the same time that seal 53 becomes ineffective. This is the manual open position of the control valve. Until the time that the check valve 61 is unseated, chamber 25 is filled with upstream pressure from the passageway through the main valve. Also, chamber 26 is filled with downstream pressure from line 32. When the check valve is unseated, pressure in chamber 26 increases due to being backed up by restriction 33. It results that the forces become such that the main valve moves toward open position. As the main valve begins to reach full open position, the needle valve 63 moves into seat 62 and begins to choke off flow of fluid from chamber 25. The valve may seek several times and then come to rest at an equilibrium position in which just sufficient fluid is lost from chamber 25 to raise the pressure in chamber 26 to a value which will maintain the main valve member in open position. It will be appreciated that the pressure in chamber 26 will now be less than would be the case if the valve 63 were not employed. Without the needle valve 63, the chamber 26 will reflect full upstream pressure. With the needle valve 63, this pressure will be much lower and only enough pressure will bleed through the needle valve to maintain the main valve open. It results that the amount of fluid which passes through the valve in the manual open position is reduced and this permits the strainer 66 to more effectively strain out any trash. As the velocity of the gas through the restriction 33 is decreased, the tendency to "freeze" and form hydrates is reduced. If any trash becomes lodged between seat 62 and needle valve 63, or if hydrates or "freezing" occurs at this point, there will result a decrease in pressure in chamber 26 which will cause the needle valve to move toward closed position and permit the needle valve to clear itself.

A further advantage of the use of the valve 63 is that it protects the frangible member in the relief valve 39. If full upstream pressure were applied to this frangible member, it would of course rupture. It will be noted that if the valve 63 is not present, that a pressure greater than downstream line pressure will be present at seal 54 when the control valve is withdrawn to automatic position, because upstream pressure would be present in chamber 26 and line 38. Thus, if we rapidly move the control valve upwardly, the seal 53 seals off the chamber 25, but as the valve member moves up O-ring 54 is uncovered to throw the frangible disc in fluid communication with the line 38. If excess pressure is present in line 38 at this time, the frangible disc may rupture. For this reason, the nut 56 has a relatively slow thread so that operation of the hand wheel will lift the slide valve slowly and permit the pressure in the chamber 26 to dissipate before the seal 54 is uncovered. By using needle valve 63, the pressure present in chamber 26 when the control valve is moved from open to automatic position, has been reduced to a value below the full upstream pressure, and thus a lesser amount of fluid need be dissipated from chamber 26 to protect the frangible relief means 39. If the spread is such that the frangible disc can withstand the pressure in chamber 26 at this time, then the slide valve could be rapidly moved to automatic position.

It will be appreciated that in automatic position the chamber 25 is isolated and chamber 26 is in communication with the frangible disc. Thus, an increase in downstream pressure will be reflected against the frangible disc, and if such increase be present the disc will rupture, venting chamber 26 and resulting in the main valve closing. On the other hand, if the downstream pressure drops to a sufficient value to reduce the pressure in chamber 26, the main valve will close.

When it is desired to manually close the valve, the control valve is retracted to uncover seal 55 which establishes communication between the chamber 26 and the vent 52 to vent chamber 26 and effect closing of the valve.

For a discussion of other features of the valve illustrated, reference is made to Thornhill Patent No. 3,049,140.

From the above, it will be seen that all of the objects of this invention have been accomplished. While the simple form of valve and seat 62 and 63 is preferred, it will be appreciated that any other arrangement might be substituted so long as the escape of fluid from chamber 25 is regulated by movement of the main valve member.

It will be appreciated that any form of valve could be substituted for the control valve so long as the valve is manually opened by utilizing high pressure from the chamber 25. See, for instance, the type of valves suggested by Thornhill Patent No. 2,684,688.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A pressure control apparatus comprising,
a main valve having a passageway therethrough adapted to be connected in a line on the high pressure side of a choke,
a valve member and valve seat controlling flow through said passageway,
means for moving the main valve member between open and closed positions including first and second variable volume chambers having opposed movable walls connected to each other and to the valve member,
said wall of the first chamber having a larger area than said wall of the second chamber,
means for establishing fluid communication between said second chamber and said passageway,
means for establishing fluid communication between said first chamber and said line downstream of said choke including an orifice,
conduit means connecting said first and second chambers,
control valve means controlling flow through said conduit means,
and a valve seat in said second chamber and a valve member connected to said wall of said second chamber controlling flow from said second chamber into said conduit means.

2. A pressure control apparatus comprising,
a main valve having a passageway therethrough adapted to be connected in a line on the high pressure side of a choke,
a valve member and valve seat controlling flow through said passageway,
a housing connected to the main valve and having a pair of axially aligned cylinders of different diameter,
a pair of pistons connected to each other and reciprocal in said cylinders,
a valve stem connecting said valve member to said pair of pistons,
a passageway extending through said valve stem and pair of pistons to establish fluid communication between the body passageway and the smaller cylinder,
a conduit establishing communication between the large cylinder and said line on the low pressure side of said choke,
a restriction in said conduit,
a second conduit providing fluid communication between said first and second cylinders,
control valve controlling flow through said second conduit,
and a valve seat in said smaller cylinder and a valve member carried by the iston therein controlling flow from the smaller cylinder into the second circuit.

3. A pressure control apparatus comprising,
a main valve having a passageway therethrough adapted to be connected in a line on the high pressure side of a choke,
a valve member and valve seat controlling flow through said passageway,
means for moving the main valve member between open and closed positions including first and second variable volume chambers having opposed movable walls connected to each other and to the valve member,
said wall of the first chamber having a larger area than said wall of the second chamber,
means for establishing fluid communication between said second chamber and said passageway,
means for establishing fluid communication between said first chamber and said line downstream of said choke including an orifice,
conduit means connecting said first and second chambers,
control valve means controlling flow through said conduit means,
and a valve seat in said second chamber and a needle valve member connected to said wall of said second chamber controlling flow from said second chamber into said conduit means.

4. A pressure control apparatus comprising,
a main valve having a passageway therethrough adapted to be connected in a line on the high pressure side of a choke,
a valve member and valve seat controlling flow through said passageway,
a housing connected to the main valve and having a pair of axially aligned cylinders of different diameter,
a pair of pistons connected to each other and reciprocal in said cylinders,
a valve system connecting said valve member to said pair of pistons,
a passageway extending through said valve stem and pair of pistons to establish fluid communication between the body passageway and the smaller cylinder,
a conduit establishing communication between the larger cylinder and said line on the low pressure side of said choke,
a restriction in said conduit,
a second conduit providing fluid communication between said first and second cylinders,
control valve means controlling flow through said second conduit,
and a valve seat in said smaller cylinder and a needle valve member carried by the piston therein controlling flow from the smaller cylinder into the second conduit.

References Cited in the file of this patent

UNITED STATES PATENTS

| | | |
|---|---|---|
| 2,227,297 | Coy | Dec. 31, 1940 |
| 2,684,688 | Thornhill | July 27, 1954 |
| 2,684,689 | Nordin | July 27, 1954 |
| 3,049,140 | Thornhill et al. | Aug. 14, 1962 |